H. BROOKS.
MEANS FOR CONTROLLING THE SUPPLY OF LIQUID FUEL TO INTERNAL COMBUSTION ENGINES.
APPLICATION FILED NOV. 29, 1918.
1,348,845.
Patented Aug. 10, 1920.
2 SHEETS—SHEET 1.
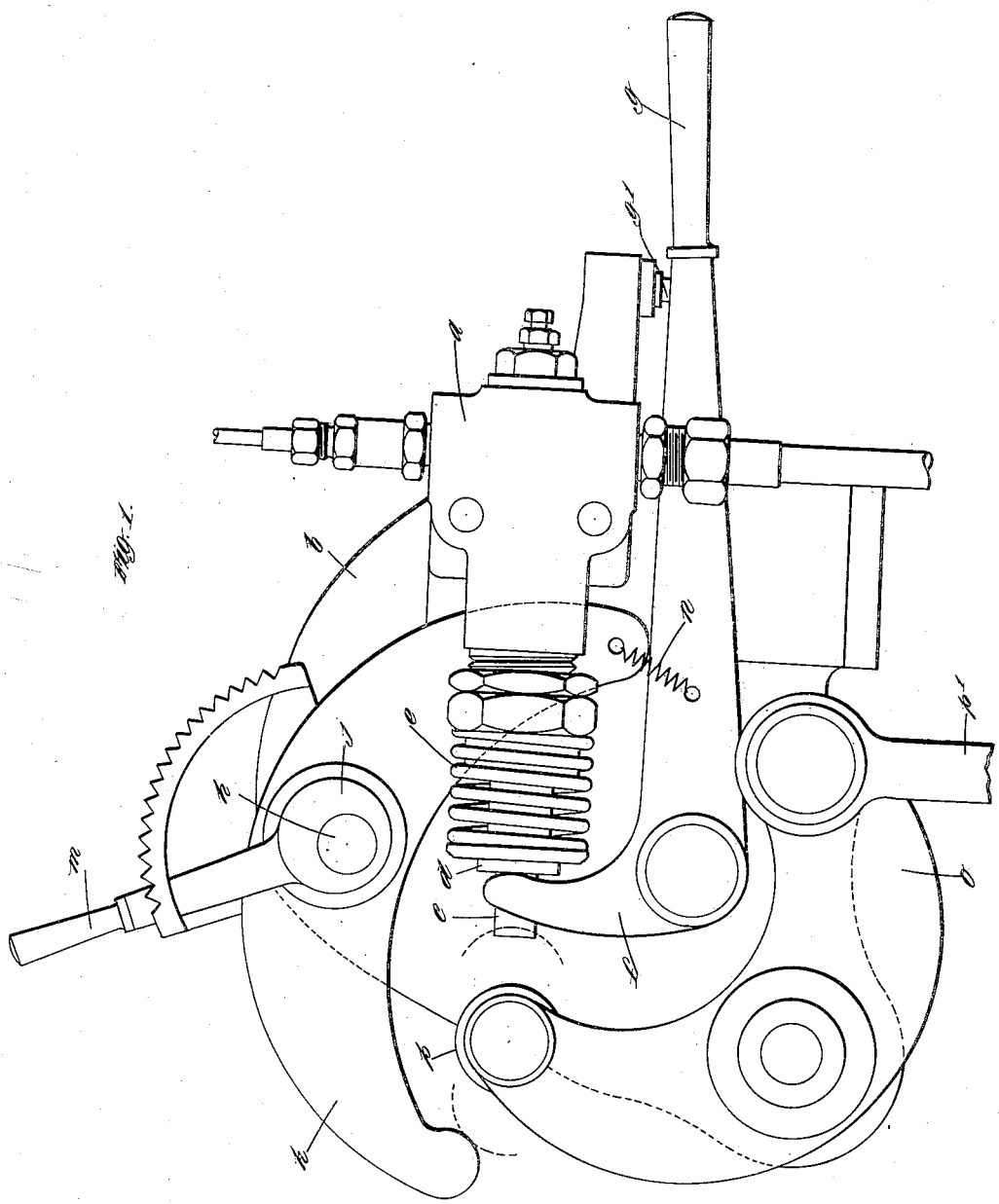
Inventor:
Herbert Brooks
By Attys

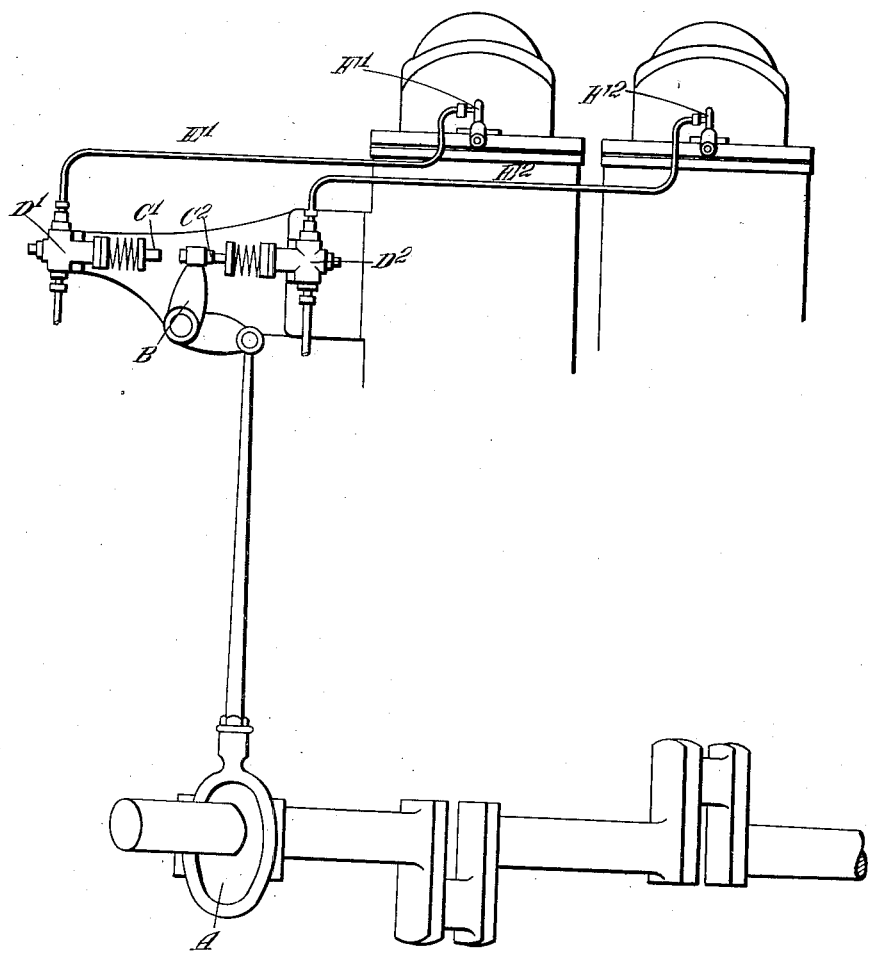

UNITED STATES PATENT OFFICE.

HERBERT BROOKS, OF YEOVIL, ENGLAND, ASSIGNOR TO PETTERS LIMITED, OF YEOVIL, ENGLAND.

MEANS FOR CONTROLLING THE SUPPLY OF LIQUID FUEL TO INTERNAL-COMBUSTION ENGINES.

1,348,845.   Specification of Letters Patent.   Patented Aug. 10, 1920.

Application filed November 29, 1918. Serial No. 264,680.

*To all whom it may concern:*

Be it known that I, HERBERT BROOKS, of "Whitleigh," St. Michael's avenue, Yeovil, in the county of Somerset, England, subject of the King of Great Britain and Ireland, have invented certain new and useful Improvements in Means for Controlling the Supply of Liquid Fuel to Internal-Combustion Engines, of which the following is a specification.

This invention relates to means for controlling the supply of liquid fuel to internal combustion engines, in which the injection of fuel usually occurs when the piston is at or near the end of the compression stroke.

The object of this invention is to provide improved means for insuring complete combustion on light loads.

In internal combustion engines in which the injection of fuel usually occurs when the piston is at or near the end of the compression stroke the injection of fuel is usually made by means of fuel pump operating gear driven from the crankshaft or camshaft of the engine and occurs at a definite moment in relation to the dead centers of the crankshaft. One of the difficulties met with in engines using liquid fuel, to obviate which several methods have been proposed, is that the ignition is uncertain or the combustion incomplete when running on light loads because the reduced amount of fuel required on light loads does not suffice to maintain inside the combustion chamber, the temperature required for regular ignition, and for the additional reason that the time which suffices for vaporization of the fuel oil when the engine is running on heavy load is insufficient when the engine is running on light loads or without load. The result is that the speed of the engine varies, and the explosions fluctuate between misfires or very feeble explosions and excessively heavy ones.

According to this invention, I provide improved means for giving an advanced or supplementary injection of fuel into the combustion chamber, that is to say an advanced injection with or without the usual injection thereby extending the period of combustion for the purpose of obtaining and maintaining a sufficiently high temperature in the cylinder or explosion chamber, to insure complete combustion on light loads or when running without load.

In multi-cylinder engines of the type referred to each cylinder is provided with a separate fuel injection apparatus comprising a fuel injection nozzle for delivering fuel into the cylinder or combustion chamber, a pipe connecting the said nozzle to a fuel injection pump and operating gear driven from the engine crankshaft for operating the said fuel pump.

In the drawings filed herewith and referred to later—

Figure 1 is a diagrammatic elevation of one form of pump adapted to give an advanced injection of fuel in accordance with this invention with or without the main injection.

Fig. 1ª is a diagrammatic view showing the essential features of the fuel injection system as heretofore applied to a two cylinder engine, but the number of cylinders is immaterial for the purpose of this description and may be one or more. Referring to Fig. 1ª such known fuel injection apparatus consists essentially of one or more eccentrics A, rocking levers B provided with hammer faces $C'$ and $C^2$, fuel pumps $D'$, $D^2$, pipes $E'$, $E^2$ and nozzles $F'$, $F^2$. Instead of an eccentric I may use a cam. It will be noticed that in a two cylinder engine with cranks at 180 degrees a single eccentric and rocking lever may be caused to operate two fuel pumps so as to give a fuel injection to two cylinders at the correct moments respectively in relation to the positions of the pistons.

In a single cylinder system there is only one fuel pump, fuel pipe and injection nozzle, but there are two hammer faces $C'$ and $C^2$. In carrying out my invention I introduce a system of levers causing the hammer face $C^2$ to operate the fuel pump toward the end of its travel thereby giving a supplementary early stroke to the fuel pump in addition to the main injection given from the hammer face $C'$.

Considering the simplest case of a single cylinder engine supplied with fuel by a pump having a plunger operated by a rocking lever which receives a reciprocating motion from an eccentric or other suitable device mounted on the controlling shaft, the said plunger being adapted to be operated in such a manner that its stroke is varied to supply the amount of fuel proportioned to the load, for the main injection I cause the rocking lever on its forward stroke to impinge directly on the plunger of the fuel pump and for the supplementary early injection I make use of the motion of the backward stroke by inserting a combination of levers to give another impact to the plunger on the backward stroke. By this means I obtain two-phase injection at intervals of 180° of the controlling shaft. Alternatively, the supplementary early pump stroke may be transmitted to a second or subsidiary pump, instead of being transmitted by a system of levers to the pump used for the main injection.

Referring now to Fig. 1, $a$ is a pump mounted on a bracket $b$ provided with a spring pressed plunger $c$. On the plunger $c$ is a collar $d$. Between the collar $d$ and the pump casing is a spring $e$ adapted to withdraw the plunger from the pump. On the bracket $b$ is pivoted a lever $f$ adapted to bear on the collar $d$. The lever is provided with a handle $g$ adapted to bear against an adjustable stop $g'$. On the bracket $b$ is a pin $h$ carrying an eccentric $j$ on which is mounted a rocking lever $k$. The eccentric $j$ is adapted to be turned on the pin $h$ by the lever $m$ to raise or lower the rocking lever $k$. One end of the rocking lever $k$ rests on the lever $f$ and is held thereto by a spring $n$. On the bracket $b$ is mounted a rocking lever or arm $o$ carrying a roller $p$ adapted to strike the lever $k$ when the lever $k$ is moved by the handle $m$ into operative position. The lever $o$ is adapted to be rocked by one end of the eccentric rod $p'$. The other end of the eccentric rod $p'$ is attached to the governor (not shown), by which means the stroke of the lever $o$ is regulated.

In operating when it is desired to obtain an advanced injection, the handle $m$ is moved to a position to bring the lever $k$ within the range of rearward movement of the lever $o$. On the reciprocation of the eccentric rod $p'$ the roller $p$ carried on the lever $o$ strikes the plunger $c$ causing the pump to deliver an ordinary injection of fuel. At the other end of the stroke the roller $p$ strikes the lever $k$ depressing one end of the lever $f$ and causing an injection of fuel into the cylinder 180° in advance of the next ordinary injection. The purpose of the handle $g$ is to put the pump out of action by moving the plunger away from the roller $p$ and thus stopping the engine.

The position of the eccentric $j$ determines the amount of advanced injection from zero, to a predetermined maximum. When the governor reduces the stroke of the lever $o$ to such an extent that the roller $p$ fails to make contact with the plunger $c$, the whole of the fuel is injected at the advanced timing. This result may also be obtained by lowering the adjustable stop $g'$ to bring the plunger $c$ out of contact with the roller $p$ at the same time keeping the lever $k$ within the range of rearward movement of the lever $o$.

This device is adapted for use with single or multi-cylinder engines.

The advanced injection may be put into operation while the engine is running, either by hand or by the automatic operation of the engine governor. When the load on the engine is sufficiently heavy or constant to maintain the temperature required for complete combustion, the normal relation between each pump and its relative engine cylinder is resumed.

What I claim as my invention, and desire to secure by Letters Patent, is:—

1. In internal combustion engines, of the single cylinder or multi-cylinder type the combination with means for injecting fuel into each cylinder when the piston is at or near the end of the compression stroke, of means for delivering an early injection of fuel in any one of said cylinders by means of fuel pumps corresponding to each cylinder at a predetermined time, with or without the main injection for the purpose set forth.

2. In internal combustion engines means for delivering a main injection of fuel when the piston is at or near the end of the compression stroke, and another injection of fuel the time of delivery of which is controlled by the angular relation of the pump operating gear, comprising a pump cylinder, a spring pressed plunger in said cylinder, means for supplying fuel to said pump cylinder and conveying the fuel to the engine cylinder, a pivoted lever adapted to bear on the said plunger, an adjustable stop adapted to limit the movement of the said pivoted lever, a rocking lever carrying a roller adapted to strike the plunger, a second rocking lever adapted to strike the said pivoted lever and to be struck by the roller carried on the first mentioned rocking lever, and means for rocking the said first mentioned rocking lever at predetermined points of a stroke of the engine to give an injection of fuel both on the forward and also on the return movement of the rocking lever.

3. In internal combustion engines a pump for delivering fuel into each cylinder, operating gear for the pump, arranged so as to repeatedly deliver the whole injection of fuel in advance of the normal time of the main injection while running on light load, without reversing the direction of rotation, the timing of the delivery being controlled by the angular relation of the pump operating gear.

4. In internal combustion engines of the single cylinder or multicylinder type the combination with cylinder pistons in said cylinders, an operating gear for each of said cylinders and means for injecting fuel into each cylinder when the piston is at or near the end of the compression stroke, of means comprising a fuel pump for delivering an early injection of fuel in any one of the cylinders by means of said fuel pump operated by the operating gear corresponding to each cylinder at a predetermined time with or without the main injection for the purpose set forth.

In witness whereof, I have hereunto signed my name.

HERBERT BROOKS.